US012420250B2

(12) United States Patent
Rowntree et al.

(10) Patent No.: US 12,420,250 B2
(45) Date of Patent: Sep. 23, 2025

(54) CONTROL SYSTEM FOR A LIVESTOCK FEED MIXER

(71) Applicant: KUHN NORTH AMERICA, INC., Brodhead, WI (US)

(72) Inventors: Bryan Rowntree, Brodhead, WI (US); Rodney Zimmerman, New Glarus, WI (US); Aaron Wepner, Brodhead, WI (US); Thomas J. Hoffman, Sun Prairie, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 917 days.

(21) Appl. No.: 17/516,170

(22) Filed: Nov. 1, 2021

(65) Prior Publication Data

US 2022/0054998 A1    Feb. 24, 2022

Related U.S. Application Data

(63) Continuation of application No. 15/994,610, filed on May 31, 2018, now Pat. No. 11,185,833.

(51) Int. Cl.
*B01F 35/221* (2022.01)
*A01K 5/00* (2006.01)
(Continued)

(52) U.S. Cl.
CPC ...... *B01F 35/221422* (2022.01); *A01K 5/002* (2013.01); *A01K 5/004* (2013.01);
(Continued)

(58) Field of Classification Search
CPC .......... B01F 15/00201; B01F 15/00253; B01F 15/00376; B01F 15/00409;
(Continued)

(56) References Cited

U.S. PATENT DOCUMENTS 5,462,354 A    10/1995  Neier et al.
5,465,914 A *  11/1995  Faccia ................. B01F 33/5021
                                                          241/101.2

(Continued)

FOREIGN PATENT DOCUMENTS

WO    2016/009098 A1 *  1/2016

*Primary Examiner* — Charles Cooley
(74) *Attorney, Agent, or Firm* — Oblon, McClelland, Maier &Neustadt, L.L.P.

(57) ABSTRACT

A control system for mixing materials for livestock feed including a container that receives the materials, agitators that mix the materials in the container, a driveline that drives the agitators at an output speed with an output torque, a power source that provides an input speed at an input torque, a continuously variable transmission that connects the driveline and the power source and having a hydrostatic loop to provide a speed ratio between the input speed and the output speed, a plurality of sensors positioned between the power source and the agitators that provides mixing signals commensurate to mixing parameters, and an electronic control unit configured to receive the mixing signals, extract mixing parameter values from the mixing signals, and actuate the continuously variable transmission and adjust the speed ratio based on the mixing parameter values to enhance efficiency of the mixing of the materials.

10 Claims, 8 Drawing Sheets

(51) Int. Cl.
  *B01F 35/212* (2022.01)
  *B01F 35/32* (2022.01)
  *B01F 35/33* (2022.01)
  *B01F 101/18* (2022.01)
  *F16H 63/06* (2006.01)

(52) U.S. Cl.
  CPC ........ *B01F 35/212* (2022.01); *B01F 35/3204* (2022.01); *F16H 63/065* (2013.01); *B01F 35/331* (2022.01); *B01F 2101/18* (2022.01); *F16H 2708/20* (2013.01)

(58) Field of Classification Search
  CPC .......... B01F 15/00428; B01F 15/00318; B01F 15/00311; B01F 15/00922; B01F 13/004; B01F 15/00194; B01F 15/00129; B01F 2215/0013; B01F 7/00; B01F 2215/0008; B01F 15/00831; B01F 15/00331; B01F 7/00933; B01F 7/08; B01F 7/24; B01F 7/242; B01F 7/245; B01F 15/0295; B01F 15/00188; B01F 15/00155; B01F 15/00538; B01F 15/0048; B01F 2015/00629; B01F 2015/00623; B01F 15/00389; B01F 35/221422; B01F 35/212; B01F 35/3204; B01F 35/331; B01F 2101/18; G05B 23/0264; G05B 2219/24084; G05B 2219/24067; G05B 2219/31462; G05B 2219/2663; G05B 2219/24015; G05B 2219/24055; G05B 15/02; G05B 19/042; G05B 2219/49197; G05B 2219/41358; G05B 2219/49255; G07C 5/008; G08B 21/182; A01K 5/00; A01K 5/001; A01K 5/004; A01K 5/0001; A01K 5/0208; A01K 5/02; A01K 5/002; A01B 76/00; A01C 7/20; G01L 3/1478; G01L 3/108; G05D 17/00; G05D 9/12; G05D 17/02; F16H 61/0204; F16H 57/025; F16H 61/0206; F16H 61/0213; F16H 63/065; F16H 2708/20; F16H 61/462; B60K 25/02; B60K 2025/024; B60K 17/28; B60Y 2200/22
  See application file for complete search history.

(56) References Cited

U.S. PATENT DOCUMENTS

| | | | | |
|---|---|---|---|---|
| 6,758,426 B2* | 7/2004 | Have | ............... | F16H 61/0269 241/101.76 |
| 7,341,372 B2* | 3/2008 | Van Der Plas | ........ | A01K 5/004 366/314 |
| 8,651,408 B1* | 2/2014 | Fox | .................. | B01F 27/172 241/261.1 |
| 8,651,730 B2* | 2/2014 | Barbi | ................ | A23N 17/007 119/51.01 |
| 8,657,485 B2* | 2/2014 | Neier | ................ | B01F 27/922 366/314 |
| 8,770,826 B2* | 7/2014 | Tamminga | ........... | F16H 57/027 366/331 |
| 8,850,910 B1* | 10/2014 | Have | ................... | A01K 5/001 366/132 |
| 8,960,995 B2* | 2/2015 | McCurdy | .............. | A23K 10/32 241/101.76 |
| 8,960,996 B2* | 2/2015 | McNab Kerr | ........ | A23K 50/10 366/141 |
| 9,010,991 B2* | 4/2015 | McFarlane | ............. | B01F 7/085 366/270 |
| 9,751,058 B2* | 9/2017 | Bedord | .................. | A01K 5/004 |
| 10,499,680 B2* | 12/2019 | Rowntree | ......... | B01F 15/00389 |
| 10,994,250 B2* | 5/2021 | Bedord | ................... | B01F 27/92 |
| 11,185,833 B2* | 11/2021 | Rowntree | ............ | B01F 35/212 |
| 2002/0179757 A1* | 12/2002 | Have | ..................... | A01K 5/004 241/101.2 |
| 2005/0172741 A1* | 8/2005 | Van Der Plas | ........ | A01K 5/004 74/336 R |
| 2006/0050604 A1* | 3/2006 | Brunazzi | ............... | A01K 5/001 366/20 |
| 2006/0256647 A1* | 11/2006 | Van Der Plas | ........ | A01K 5/004 366/141 |
| 2009/0238032 A1* | 9/2009 | McFarlane | ............. | B01F 7/085 366/270 |
| 2011/0064865 A1* | 3/2011 | McCurdy | ............... | A01K 5/002 426/623 |
| 2011/0112688 A1* | 5/2011 | McCurdy | ............... | A01K 5/002 700/265 |
| 2011/0261641 A1* | 10/2011 | Barbi | ................... | A23N 17/007 366/141 |
| 2012/0008457 A1* | 1/2012 | Neier | .................... | A01K 5/004 366/190 |
| 2012/0065759 A1* | 3/2012 | Kerr | .................... | A23K 50/10 700/103 |
| 2012/0069700 A1* | 3/2012 | Tamminga | .............. | B01F 7/245 366/314 |
| 2015/0240939 A1* | 8/2015 | Ge | ....................... | E02F 9/2054 701/50 |
| 2016/0129408 A1* | 5/2016 | Peeters | .................. | B01F 7/245 366/297 |
| 2016/0143249 A1* | 5/2016 | Peeters | ................. | B01F 13/004 241/36 |
| 2016/0339405 A1* | 11/2016 | Bump | .................. | B01F 13/004 |
| 2016/0339406 A1* | 11/2016 | Bump | .................. | B01F 13/004 |
| 2016/0343231 A1* | 11/2016 | Bump | .................. | B01F 13/004 |
| 2017/0065948 A1* | 3/2017 | Bedord | .................. | G05D 17/02 |
| 2017/0067556 A1* | 3/2017 | Sailer | ..................... | A01K 5/004 |
| 2017/0068259 A1* | 3/2017 | Patz | ..................... | F16H 61/0213 |
| 2017/0167580 A1* | 6/2017 | Bondioli | ............... | A01K 5/004 |
| 2018/0255823 A1* | 9/2018 | Rowntree | ............ | A23N 17/007 |
| 2019/0366287 A1* | 12/2019 | Rowntree | ............. | A01K 5/002 |
| 2025/0151693 A1* | 5/2025 | Vanni | ................. | A01K 5/0266 |

\* cited by examiner

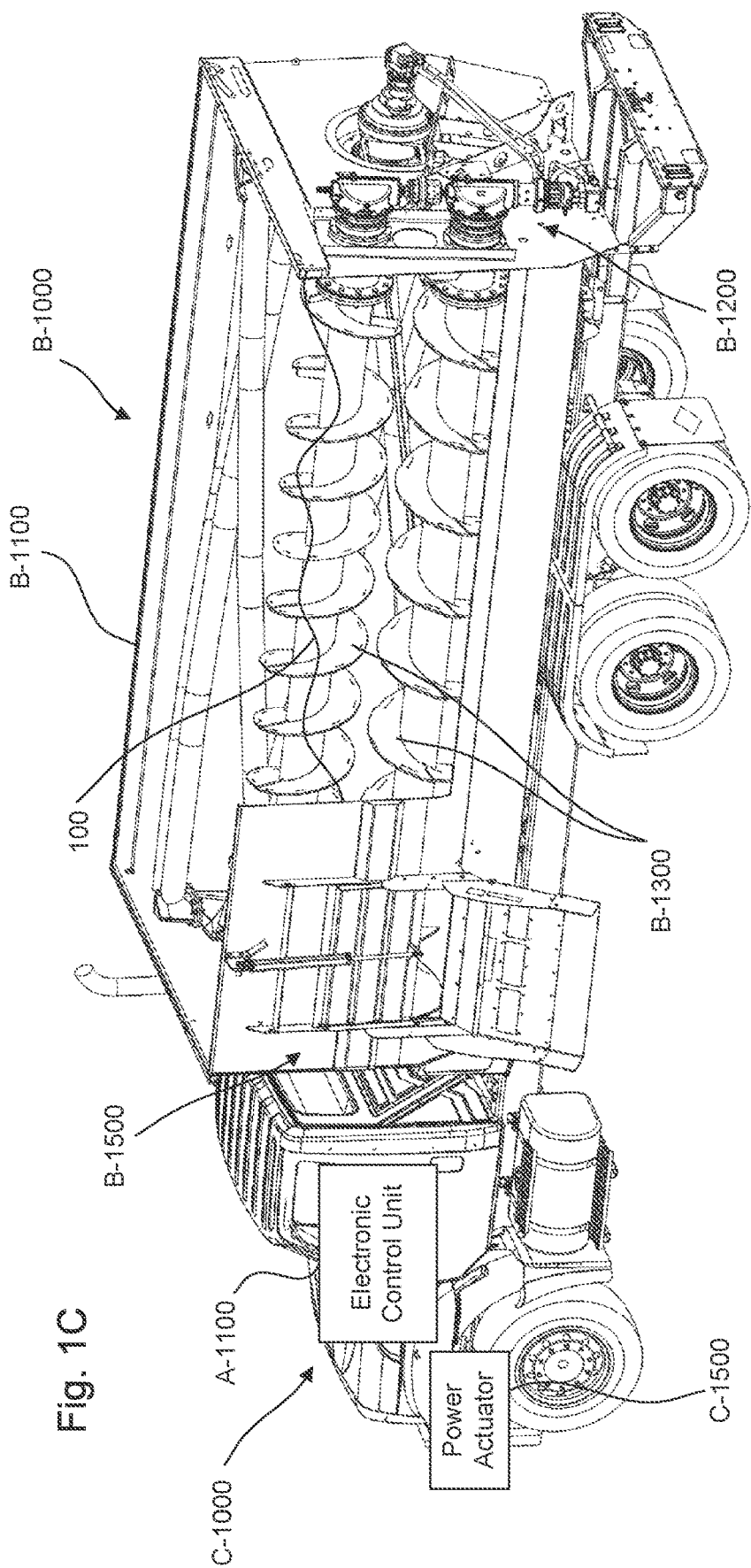

CONTROL SYSTEM FOR A LIVESTOCK FEED MIXER

CROSS-REFERENCE TO RELATED APPLICATIONS

This application is a continuation of U.S. application Ser. No. 15/994,610, filed May 31, 2018, the entire contents of which is incorporated herein by reference.

BACKGROUND

Field of the Disclosure

The present disclosure relates to control system for mixers. More precisely, the present application relates to transmission control applied to livestock feed mixers.

DESCRIPTION OF THE RELATED ART

In today's livestock management, feeding a large number of animals precisely and rapidly is essential.

Such a demand in livestock feeding can be addressed with agricultural machinery that can receive large quantities of feed materials, e.g., hay and grains, mix uniformly these feed materials to obtain a homogenous feed mixture, transport and distribute this feed mixture to the livestock.

To this end, conventional livestock feed mixers that utilize an external source of torque, e.g., a tractor, to mix the feed materials have been adopted. In such conventional livestock feed mixers, torque and/or power requirements can be important and varied as physical characteristics of the feed materials, e.g., viscosity, mass, or volume, as well as mixing characteristics, mixing homogeneity or mixing time, can vary depending on a plurality of characteristics, e.g., livestock size and type, or weather conditions.

Although such conventional livestock feed mixers are widely used, they present important drawbacks. Notably such conventional livestock feed mixers lack in providing an efficient and fast mixing for the feed materials. When feed materials are added and/or released from the conventional livestock feed mixers, mixing conditions can change abruptly and make the mixing inefficient and/or slow.

Thus, a control system for livestock feed mixer solving the aforementioned problem is desired.

SUMMARY

Accordingly, the object of the present disclosure is to provide a system and a method to control a livestock feed mixer which overcomes the above-mentioned limitations.

The control system of the present disclosure provides an efficient mixing by monitoring the mixing conditions and adjusting the livestock feed mixer based on the mixing conditions via a continuously variable transmission.

In one non-limiting illustrative example, a control system for a livestock feed mixer is presented. The control system for a livestock feed mixer includes a container that receives the materials, agitators that mix the materials in the container, a driveline that drives the agitators at an output speed with an output torque, a power source that provides an input speed at an input torque, a continuously variable transmission that connects the driveline and the power source and having a hydrostatic loop to provide a speed ratio between the input speed and the output speed, a plurality of sensors positioned between the power source and the agitators that provides mixing signals commensurate to mixing parameters, and an electronic control unit configured to receive the mixing signals, extract mixing parameter values from the mixing signals, and actuate the continuously variable transmission and adjust the speed ratio based on the mixing parameter values to enhance efficiency of the mixing of the materials.

In another non-limiting illustrative example, a method to control torque of a livestock feed mixer is presented. The control system includes a container to receive the materials, agitators to mix the materials in the container, a driveline to drive the agitators at an output speed with an output torque, a power source to provide an input speed with an input torque, a continuously variable transmission to connect the driveline to the power source and provide a speed ratio between the input speed and the output speed, a plurality of sensors positioned between the power source and the agitators that provides mixing signals commensurate to mixing parameters; and an electronic control unit configured to control the mixing of the materials. The method to control torque includes acquiring, via the plurality of sensors and software instructions executed by the electronic control unit, mixing parameters, detecting, via software instructions executed by the electronic control unit, if the materials are being loaded in the container based on the mixing parameters, detecting, via software instructions executed by the electronic control unit, if the materials are being released from the container based on the mixing parameters, and adjusting, via software instructions executed by the electronic control unit, a value of the speed ratio to increase or decrease the output speed and enhance the releasing and the mixing of the materials.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1C is a cross sectional view of a livestock feed mixer torqued by a power source and controlled by a control system in a third configuration, according to certain aspects of the disclosure;

DETAILED DESCRIPTION

Figure 1A:
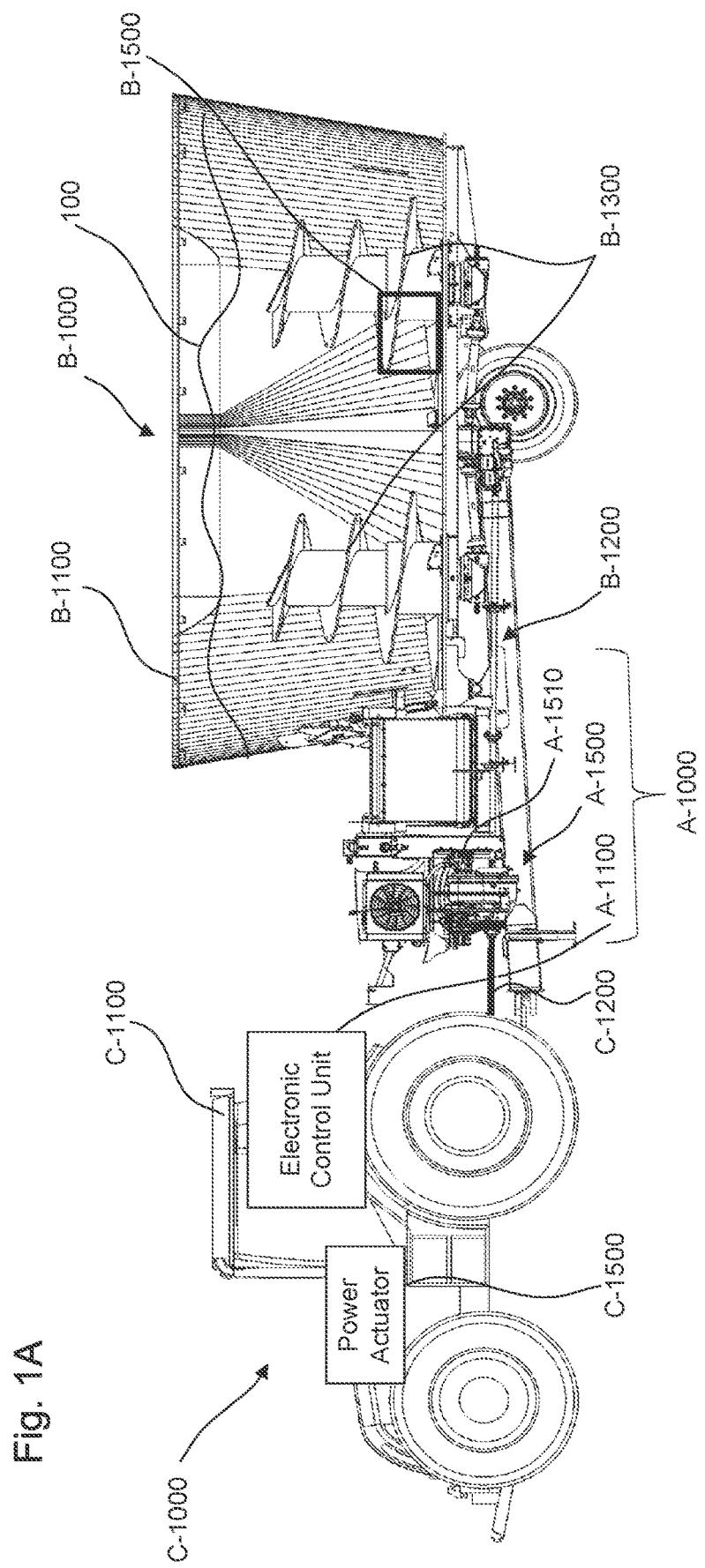
FIG. 1A is a cross sectional view of a livestock feed mixer torqued by a power source and controlled by a control system in a first configuration, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an" and the like include a meaning of "one or more", unless stated otherwise. The drawings are generally drawn not to scale unless specified otherwise or illustrating schematic structures or flowcharts.

It is to be understood that terms such as "front," "rear," and the like that may be used herein merely describe points of reference and do not necessarily limit embodiments of the present disclosure to any particular orientation or configuration. Furthermore, terms such as "first," "second," "third," etc., merely identify one of a number of portions, components, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figure 1B:
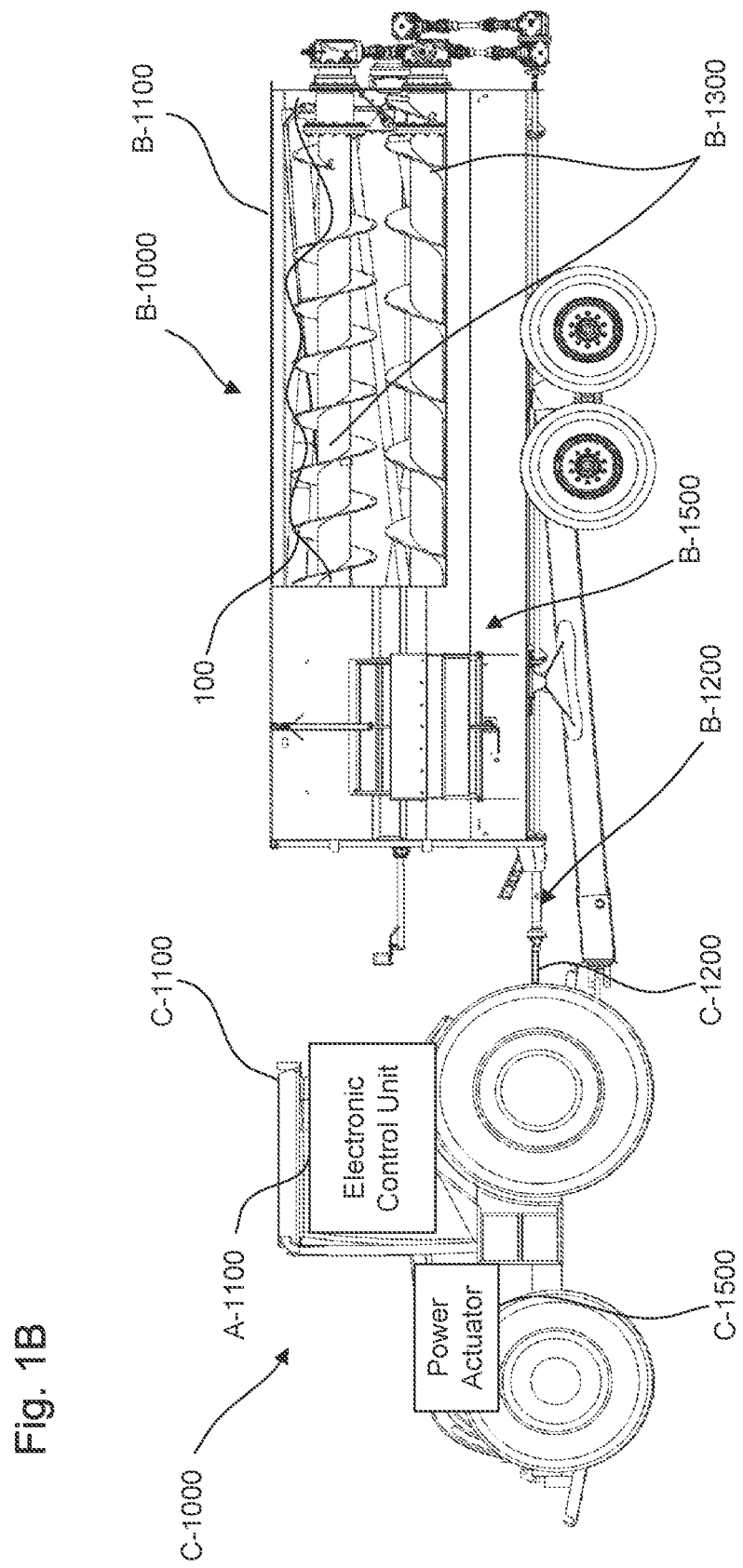
FIG. 1B is a cross sectional view of a livestock feed mixer torqued by a power source and controlled by a control system in a second configuration, according to certain aspects of the disclosure.

FIGS. 1A-1C are cross sectional views of a livestock feed mixer B-1000 powered by a power source C-1000 and controlled by a control system A-1000 in a first configuration, a second configuration, and a third configuration, according to certain aspects of the disclosure.

The livestock feed mixer B-1000 includes a container B-1100 to receive materials 100, e.g., hay and/or grains, agitators B-1300, a driveline B-1200 to transfer an output torque $T_{out}$ from the control system A-1000 to the agitators B-1300, and an opening system B-1500, e.g., articulable doors, to open the container B-1100 on an external environment and allow the materials 100 to be discharged and to close the container B-1100 to the external environment and allow the materials 100 to be loaded in the container B-1100.

The power source C-1000 can be a tractor C-1100 with a torque take-off C-1200, as illustrated by first and second configurations in FIGS. 1A-1B, an internal combustion engine of a truck as illustrated by a third configuration in FIG. 1C, an electric motor, or any other type of source of torque and/or power that can provide an input torque $T_{in}$ at an input speed $W_{in}$ to the control system A-1000.

The power source C-1000 can include a power source actuator C-1500 operatively connected to the control system A-1000 to adjust the input speed $W_{in}$ and/or the input torque $T_{in}$, e.g., a throttle of the internal combustion engine, and/or electrical motor controls.

The agitators B-1300 can be reels and/or augers placed substantially vertically, as illustrated in FIG. 1A, or placed substantially horizontally, as illustrated by the second and third configurations in FIGS. 1B-1C.

The control system A-1000 provides optimization of the livestock feed mixer B-1000 by controlling the transmission of torque between the power source C-1000 and the livestock feed mixer B-1000 and/or by directly controlling the input torque $T_{in}$ from the power source C-1000 depending on mixing conditions, e.g., addition of materials 100, and/or release of materials 100, in the livestock feed mixer B-1000.

Figure 2:
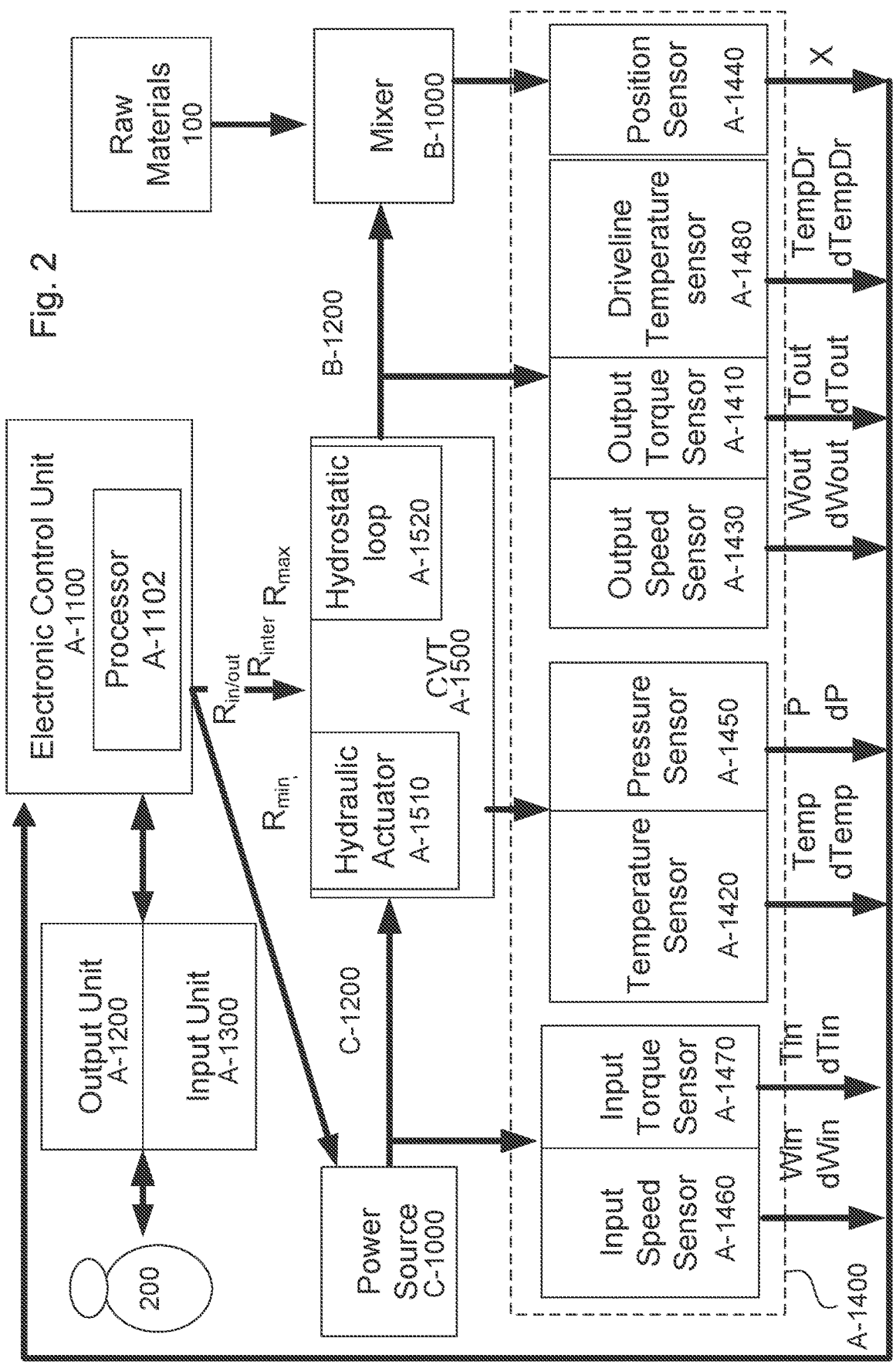
FIG. 2 is a schematic view of the control system, according to certain aspects of the disclosure.

FIG. 2 is a schematic view of the control system A-1000, according to certain aspects of the disclosure.

The control system A-1000 can include an electric control unit A-1100, an output unit A-1200 electronically connected to the electric control unit A-1100 to display key information to an operator 200, an input unit A-1300 electronically connected to the electric control unit A-1100 to receive input information from the operator 200, a continuously variable transmission (CVT) A-1500 actuated by the electric control unit A-1100 and connecting the torque take-off C-1200 of the power source C-1000 to the driveline B-1200 of the livestock feed mixer B-1000, and a plurality of sensors A-1400 to provide signals indicative of the mixing conditions, e.g., pressure, temperature, rotational velocity, torque, receiving and/or releasing of the materials 100.

The continuously variable transmission (CVT) A-1500 transmits the input torque $T_1$ from the torque take-off C-1200 of the power source C-1000 to the output torque $T_{out}$ for the driveline B-1200 of the livestock feed mixer B-1000 and converts the input speed $W_{in}$ from the torque take-off C-1200 into an output speed $W_{out}$ for the driveline B-1200 to actuate the agitators B-1300.

The continuously variable transmission A-1500 includes a hydraulic actuator A-1510 to adjust a speed ratio $R_{in/out}$ between the input speed $W_{in}$ and the output speed $W_{out}$.

The hydraulic actuator A-1510 can include a pump and motor mounted onto a hydrostatic loop A-1520, as illustrated in FIG. 2, that circulates a hydraulic fluid, e.g., oil, and provides variable flow of the hydraulic fluid. The hydraulic actuator A-1510 can adjust the speed ratio $R_{in/out}$ between a minimum speed ratio $R_{min}$ and a maximum speed ratio $R_{max}$ by varying the flow of the hydraulic fluid between a minimum flow $F_{min}$, corresponding to a full negative displacement $D_{min}$, and a maximum flow $F_{max}$, corresponding to a full positive displacement $D_{max}$.

Figure 5A:
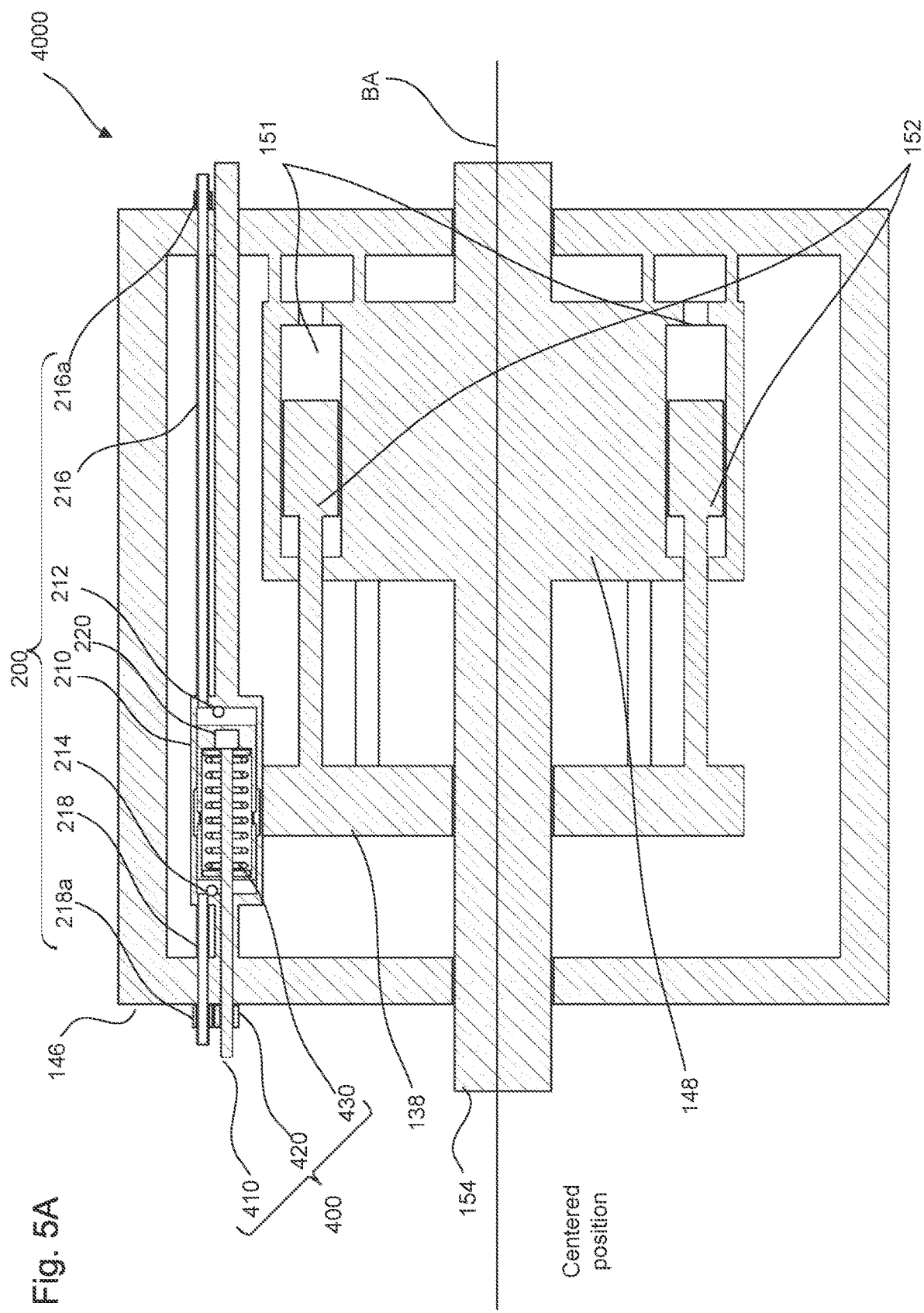
FIG. 5A is a sectional view of a variable displacement pump in a centered position of the livestock feed mixer, according to certain aspects of the disclosure.
Figure 5B:
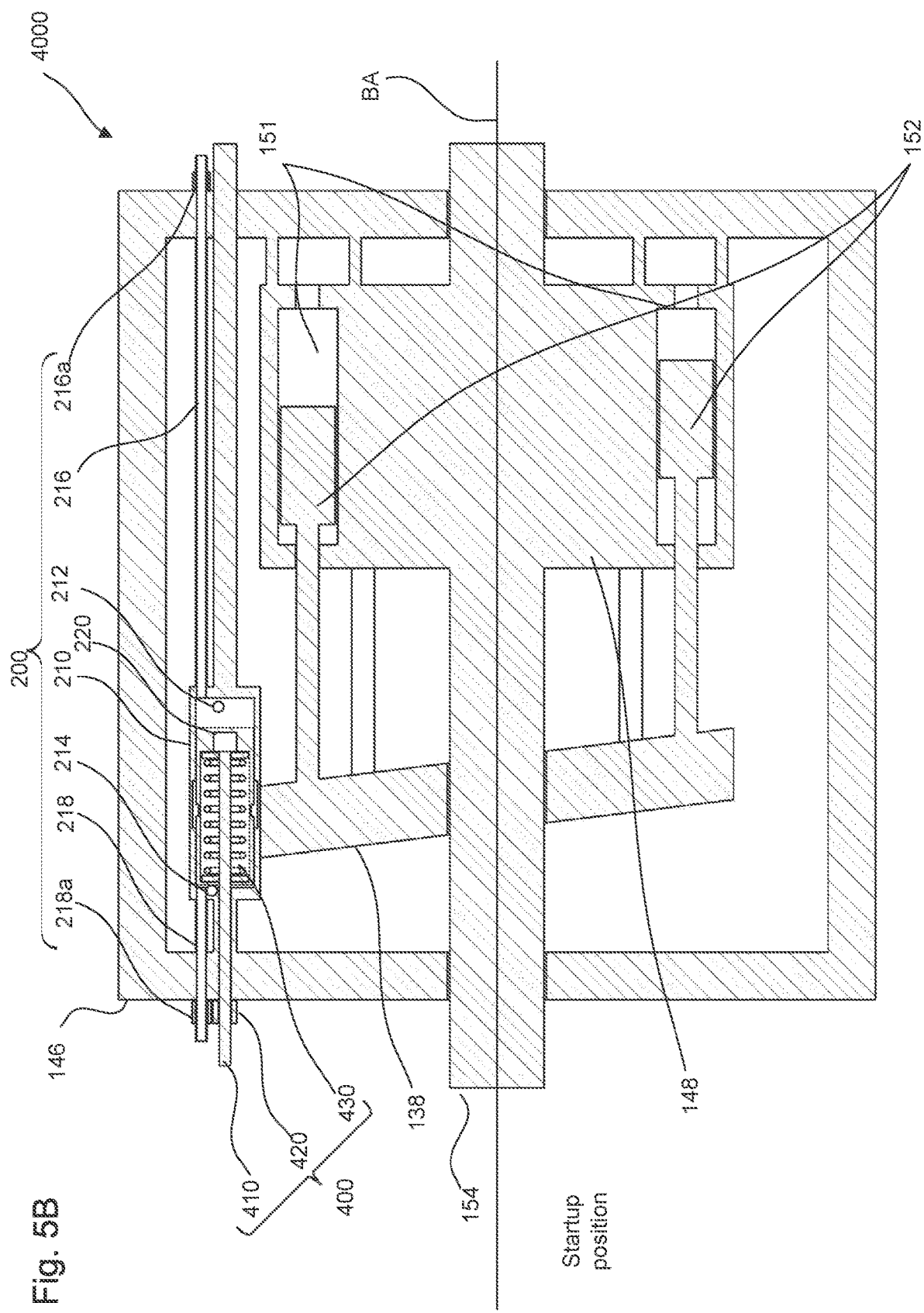
FIG. 5B is a sectional view of the variable displacement pump in a startup position of the livestock feed mixer, according to certain aspects of the disclosure.

For example, the pump can be a variable displacement pump 4000, as illustrated in FIGS. 5A-5B that can adjust the speed ratio $R_{in/out}$ between the minimum speed ratio $R_{min}$ and the maximum speed ratio $R_{max}$ by relying on articulating a swash plate 138. In addition, the variable displacement pump 4000 can be configured to facilitate engagement between the power source C-1000 and the livestock feed mixer B-1000, e.g., startup, by relying on a bias system 400 that maintained the swash plate 138 at a predetermined position. The predetermined position being between 0 and 100% negative displacement and preferably between and 35% and 65% negative displacement.

The different elements of the variable displacement pump 4000 as well as their interactions will be described in further details in the following paragraphs.

The speed ratio $R_{in/out}$ can be adjusted by the electronic control unit A-1100 to provide values of the output speed $W_{out}$ that follows operator instructions entered through the input unit A-1300 or that follows software instructions executed by a processor A-1102 including processing circuitry inside the electronic control unit A-1100 to optimize the livestock feed mixer B-1000, as illustrated in FIG. 2.

The continuously variable transmission A-1500 is characterized by a maximum output torque $T_{out\ max}$ above which the continuously variable transmission A-1500 may experience reduced life or failure. For example, the maximum output torque $T_{out\ max}$ can correspond to a maximum hydraulic pressure of the hydraulic actuator A-1510 and/or the hydrostatic loop A-1520. The maximum hydraulic pressure can be between 100 bar and 1000 bar, preferably between 300 bar and 500 bar which can correspond to a value of the maximum output torque $T_{out\ max}$ between 1020 Nm and 10200 Nm, and preferably between 3070 Nm and 5100 Nm.

The torque take-off C-1200 is characterized by a maximum input torque $T_{in\ max}$ above which the power source C-1000 fails to provide necessary torque to mix the materials 100. For example, the maximum output torque $T_{out\ max}$ can be between 500 Nm and 5000 Nm, and preferably between 1000 Nm and 3000 Nm.

The plurality of sensors A-1400 can include a hydraulic pressure sensor A-1450 placed on the hydraulic actuator A-1510 and/or the hydrostatic loop A-1520 to provide to the electronic control unit A-1100 pressure signals indicative of values of the pressure P and/or values of rate of change of the pressure dP of the hydraulic fluid of the continuously variable transmission A-1500, a hydraulic fluid temperature sensor A-1420 placed on the hydraulic actuator A-1510 and/or the hydrostatic loop A-1520 to provide to the electronic control unit A-1100 temperature signals indicative of values of the temperature Temp and/or values of rate of change of the temperature dTemp of the continuously variable transmission A-1500, an output speed sensor A-1430 positioned between the continuously variable transmission A-1500 and the mixer B-1000, e.g., on the driveline B-1200 to provide to the electronic control unit A-1100 speed signals indicative of values of the output speed $W_{out}$ and/or values of rate of change of the output speed $dW_{out}$, an output torque sensor A-1410 positioned between the continuously variable transmission A-1500 and the mixer B-1000 to provide to the electronic control unit A-1100 output torque signals indicative of values of the output torque $T_{out}$, and/or values of rate of change of the output torque $dT_{out}$, an input speed sensor A-1460 positioned between the power source C-1000 and the continuously variable transmission A-1500, e.g., on the torque take-off C-1200 or the hydraulic actuator A-1510, to provide to the electronic control unit A-1100 input speed signals indicative of values of the input speed $W_1$ and/or values of rate of change of the input speed $dW_{in}$, an input torque sensor A-1470 positioned between the power source C-1000 and the continuously variable transmission A-1500 to provide to the electronic control unit A-1100 input torque signals indicative of values of the input torque $T_{in}$, and/or values of rate of change of the input torque $dT_{in}$, and a position sensor A-1440 to provide to the electronic control unit A-1100 position signals indicative of the articulation state of the opening system B-1500, e.g., open, closed, and between thereof.

In addition, the plurality of sensors can include a driveline temperature sensor A-1480 positioned on the driveline B-1200 to provide to the electronic control unit A-1100 driveline temperature signals indicative of values of the driveline temperature TempDr and/or values of rate of change of the driveline temperature dTempDr of the different elements of the driveline B-1200, e.g., gearboxes, shaft, bearings, and the like.

The output unit A-1200 can be configured to display the key information to the operator 200 via a status bar, graphical user interface, visualization systems, and/or additive systems.

The input unit A-1300 is configured to receive the input information from the operator 200 and transmits the input information to the electronic control unit A-1100. For example, the input system A-1300 can include push buttons, keyboard buttons, and/or touch screen sensitive icons and the input information can include a value of an output target speed $W_{out\ target}$ for the livestock feed mixer B-1000, a value for the maximum input torque $T_{in\ max}$ available by the power source C-1000, a value of the minimum speed ratio $R_{min}$, a value of the maximum speed ratio $R_{max}$, and a value for the maximum output torque $T_{out\ max}$ that can be transmitted by the continuously variable transmission A-1500.

Figure 4:
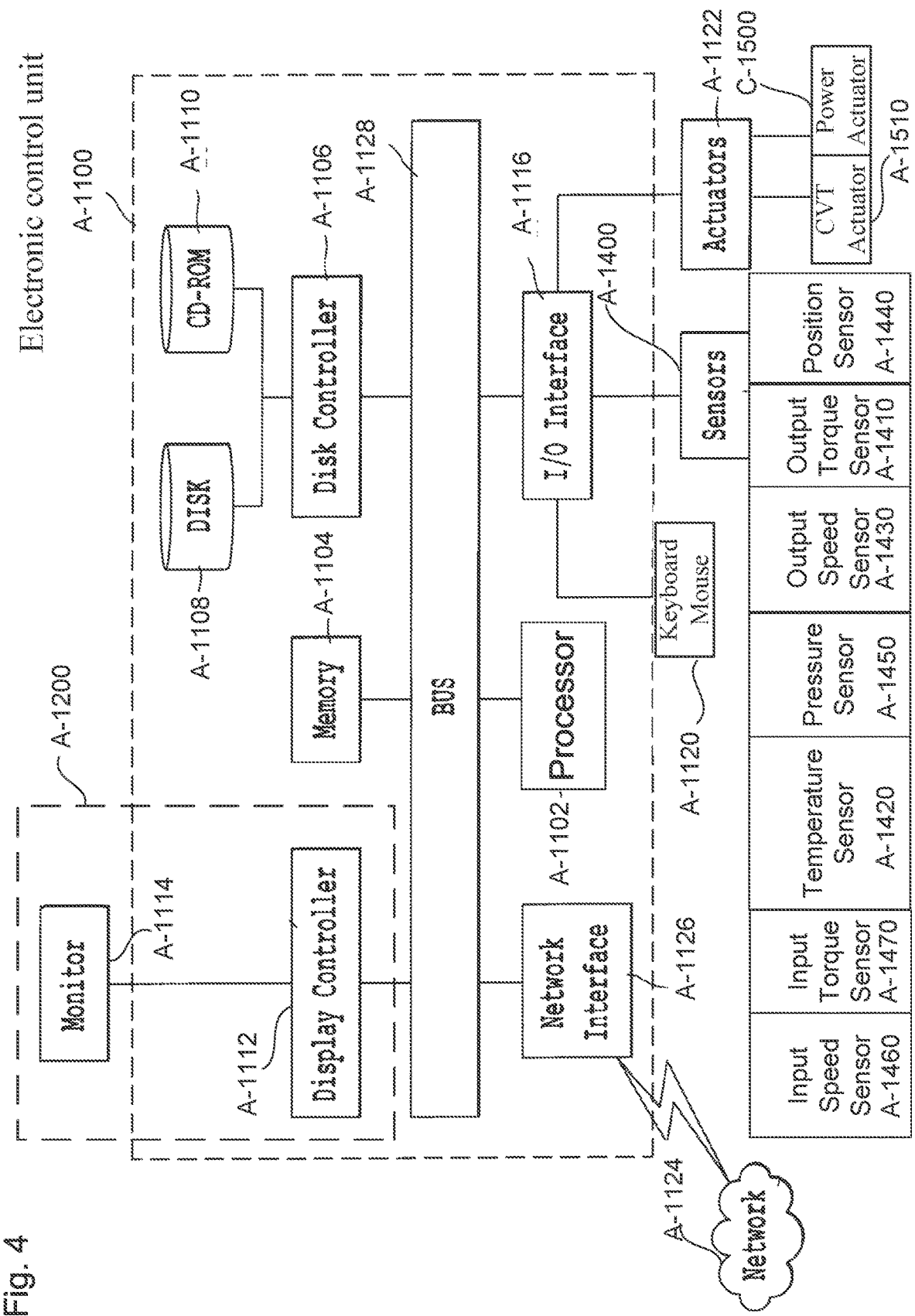
FIG. 4 is a schematic view of a hardware diagram of an electronic control unit for operating the control system, according to certain aspects of the disclosure.

Alternatively, the values of the maximum input torque $T_{in\ max}$, the minimum speed ratio $R_{min}$, the maximum speed ratio $R_{max}$, the maximum output torque $T_{out\ max}$ can be selected from a list of default values stored in the memory A-1104 and/or database of the electric control unit A-1100, as illustrated in FIG. 4.

Alternatively, the values of the maximum input torque $T_{in\ max}$, the minimum speed ratio $R_{min}$, the maximum speed ratio $R_{max}$, and the maximum output torque $T_{out\ max}$ can be downloaded from a memory of the power source C-1000 to the memory A-1104 and/or database of the electric control unit A-1100.

Figure 3:
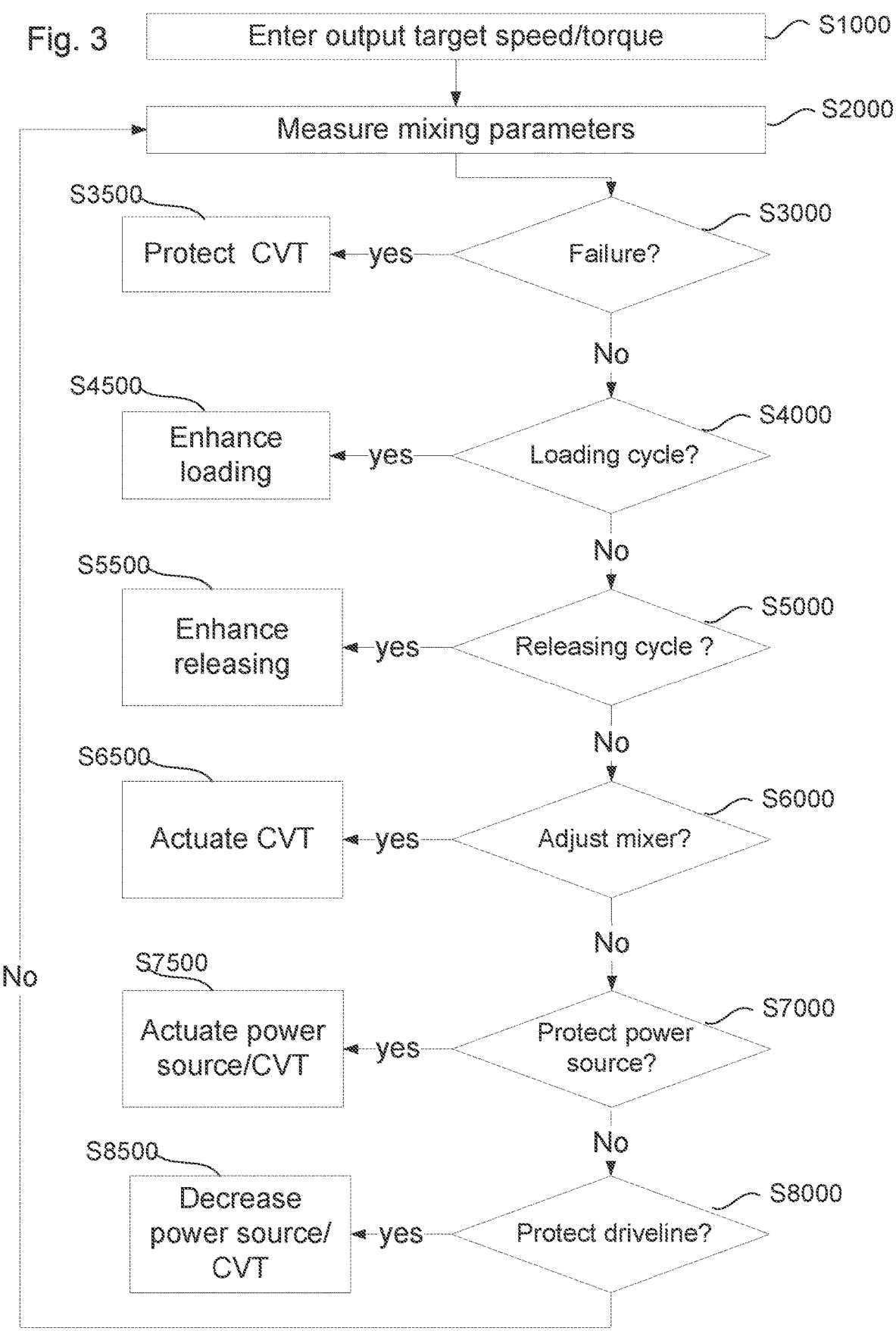
FIG. 3 is a flow chart of a method for operating the livestock feed mixer through the control system, according to certain aspects of the disclosure.

FIG. 3 is a flow chart of a method for operating the livestock feed mixer B-1000 through the control system A-1000, according to certain aspects of the disclosure.

In a step S1000, an output target speed $W_{out\ target}$ and/or an output target torque $T_{out\ target}$ is manually entered by the operator 200 via the input system A-1300 or automatically selected from the list of default values, via software instructions executed by the electronic control unit A-1100.

In a step S2000, the mixing parameters relevant to the control and optimization of the livestock feed mixer B-1000 are measured. The measure of the mixing conditions can be automatically performed via software instructions executed by the electronic control unit A-1100. For example, the software instructions can be written and the electronic control unit A-1100 can be configured to receive the pressure signals indicative of values of the pressure P and/or values of rate of change of pressure dP of the hydraulic fluid of the continuously variable transmission A-1500 from the hydraulic pressure sensor A-1450, the temperature signals indicative of values of the temperature Temp and/or values of rate of change of temperature dTemp of the continuously variable transmission A-1500 from the hydraulic fluid temperature sensor A-1420, the speed signals indicative of values of the output speed $W_{out}$ and/or values of rate of change of the output speed $dW_{ou}$ from the output speed sensor A-1430, the output torque signals indicative of values of the output power $T_{out}$, and/or values of rate of changes of the output/input power $dT_{out}$ from the output torque sensor A-1410, input speed signals indicative of values of the input speed $W_{in}$ and/or values of rate of change of the input speed $dW_{in}$ from the input speed sensor A-1460, the input torque signals indicative of values of the input power $T_{in}$, and/or rate values of rate of changes of the input power $dT_{in}$ from input torque sensor A-1470, the position signals indicative of the articulation state of the opening system B-1500 from a position sensor A-1440.

In a step S3000, risks of failure, e.g., overheating, and/or abnormal friction, that can affect the livestock feed mixer B-1000 and/or the continuously variable transmission A-1500 are detected. The detection of risks of failure for the livestock feed mixer B-1000 and/or the continuously variable transmission A-1500 can be detected automatically through software instructions executed by the electronic control unit A-1100 and based on the values of the mixing parameters measured in the step S1000.

For example, the software instructions can be written and the electronic control unit A-1100 can be configured to receive the temperature signals of the hydraulic fluid of the continuously variable transmission A-1500, extract values of the temperature Temp of the hydraulic fluid of the continuously variable transmission A-1500, and compare the values the temperature Temp of the hydraulic fluid of the continuously variable transmission A-1500 to a minimum temperature threshold $Temp_{min}$ and a maximum temperature threshold $Temp_{max}$ The risks of failure for the continuously variable transmission A-1500 and/or the livestock feed mixer B-1000 can be detected if the values of the temperature Temp are below the minimum temperature threshold Temp$_{min}$, e.g., warm up may be necessary, or if the values of the temperature Temp are above the maximum temperature threshold Temp$_{max}$, e.g., overheating protection may be necessary.

In another example, the software instructions can be written and the electronic control unit A-1100 can be configured to receive the temperature signals, extract values of rate of change of temperature dTemp of the continuously variable transmission A-1500, and compare the values of the rate of change of the temperature dTemp to a minimum temperature rate threshold dTemp$_{min}$ and a maximum temperature rate threshold dTemp$_{max}$. The risks of failure for the continuously variable transmission A-1500 and/or the livestock feed mixer B-1000 can be detected if values of the rate of change of temperature dTemp are below the minimum temperature rate threshold dTemp$_{min}$, e.g., warm up may be necessary, presence of defective sensors such as the hydraulic fluid temperature sensor A-1420, and/or the hydraulic pressure sensor A-1450, and/or defective actuators such as the hydraulic actuator A-1510, and/or hydrostatic loop A-1520, or if the values of the rate of change of the temperature Temp are above the maximum temperature rate threshold dTemp$_{max}$, e.g., overheating protection may necessary.

If the risks of failure for the continuously variable transmission A-1500 and/or the livestock feed mixer B-1000 are detected the process goes to a step S3500. Otherwise, the process goes to a step S4000.

In the step S3500, the process is configured to protect the continuously variable transmission A-1500 by minimizing and/or reducing heat generated in the hydraulic fluid.

For example, through software instructions executed by the electronic control unit A-1100, the hydraulic actuator A-1510 can actuate the continuously variable transmission A-1500 to reduce and/or minimize the hydraulic flow. The hydraulic actuator A-1510 can actuate the continuously variable transmission A-1500 to have a value of the speed ratio R$_{in/out}$ that is approximatively equal to a minimum hydraulic flow rate of the hydraulic fluid going through the continuously variable transmission A-1500 to limit and/or reduce heat in the hydraulic fluid.

In another example, through software instructions executed by the electronic control unit A-1100, the hydraulic actuator A-1510 actuates the continuously variable transmission A-1500 to smoothly transition from the minimum speed ratio R$_{min}$ up to a speed ratio corresponding to the output target speed W$_{out\ target}$ The hydraulic actuator A-1510 can maintain the continuously variable transmission A-1500 at the minimum speed ratio R$_{min}$ for a predetermined period of time such that the driveline B-1200 and the agitators B-1300 have a constant speed and then the hydraulic actuator A-1510 can gradually increase the speed ratio R$_{in/out}$ UP to a value corresponding to the output target speed W$_{out\ target}$. The predetermined period of time can be between 0.1 second and 100 seconds and preferably between 1 second and 10 seconds.

In a step S4000, it is detected if the livestock feed mixer B-1000 is in a loading state, e.g., materials 100 are being added to the container B-1100. The detection that the livestock feed mixer B-1000 is in the loading state can be performed automatically through software instructions executed by the electronic control unit A-1100 and based on the values of the mixing parameters measured in the step S2000.

For example, the software instructions can be written and the electronic control unit A-1100 can be configured to receive the pressure signals of the hydraulic fluid of the continuously variable transmission A-1500, extract values of the pressure P of the hydraulic fluid of the continuously variable transmission A-1500, and compare the values of the pressure P of the hydraulic fluid of the continuously variable transmission A-1500 to a minimum pressure threshold P$_{min}$ corresponding to pressures of an empty load, e.g., no materials 100 are present in the container B-1100. The loading state for the livestock feed mixer B-1000 can be detected if the values of the pressure P are above the minimum pressure threshold Pmin.

In another example, the software instructions can be written and the electronic control unit A-1100 can be configured to receive the pressure signals of the hydraulic fluid of the continuously variable transmission A-1500, extract values of the rate of change of the pressure dP of the hydraulic fluid of the continuously variable transmission A-1500, and compare the values of the rate of change of the pressure dP of the hydraulic fluid of the continuously variable transmission A-1500 to a minimum pressure rate threshold dP$_{min}$ corresponding to values of the rate of change of pressure for an steady load, e.g., no materials 100 are added to the container B-1100. The loading state for the livestock feed mixer B-1000 can be detected if the values of the rate of change of the pressure dP are above the minimum pressure rate threshold dPmin.

In another example, the software instruction can be written and the electronic control unit A-1100 can be configured to receive the position signals, and determine the articulation state of the opening system B-1500. The loading state for the livestock feed mixer B-1000 can be detected if the articulation state of the opening system B-1500 indicates a closed state and/or an articulation towards a closed state.

If the loading state is detected the process goes to a step S4500. Otherwise, the process goes to a step S5000.

In a step S4500, the process is configured to enhance the efficiency of the mixing for the livestock feed mixer B-1000.

For example, through software instructions executed by the electronic control unit A-1100, the hydraulic actuator A-1510 actuates the continuously variable transmission A-1500 to increase the hydraulic flow and the output speed W$_{out}$. The hydraulic actuator A-1510 can actuate the continuously variable transmission A-1500 to have a value of the speed ratio R$_{in/out}$ that is approximatively equal to the maximum speed ratio R$_{max}$ to maximize the speed of the mixing of the materials 100 and to maximize the output torque T$_{out}$ provided by the power source C-1000.

In a step S5000, it is detected if the livestock feed mixer B-1000 is in a releasing state, e.g., when materials 100 is released from the container B-1100. The detection that the livestock feed mixer B-1000 is in the release state can be performed automatically through software instructions executed by the electronic control unit A-1100 and based on the values of the mixing conditions measured in the step S2000.

For example, the software instructions can be written and the electronic control unit A-1100 can be configured to receive the pressure signals of the hydraulic fluid of the continuously variable transmission A-1500, extract values of the pressure P of the hydraulic fluid of the continuously variable transmission A-1500, and compare the values of the pressure P of the hydraulic fluid of the continuously variable transmission A-1500 to a maximum pressure threshold P$_{max}$ corresponding to a substantially full load, e.g., the container B-1000 is filled with the materials 100. The releasing state for the livestock feed mixer B-1000 can be detected if the values of the pressure P are below the maximum pressure threshold Pmax.

The minimum pressure threshold Pmin and the maximum pressure threshold Pmax can be predetermined based on manufacturer characteristics/requirements, e.g., dimensions and/or operation parameters ranges of the continuously variable transmission A-1500. In addition, the minimum pressure threshold Pmin and the maximum pressure threshold Pmax can be determined and dynamically adjusted based on the values of the mixing conditions measured in the step S2000 through interpolation and/or extrapolation.

In another example, the software instructions can be written and the electronic control unit A-1100 can be configured to receive the pressure signals of the hydraulic fluid of the continuously variable transmission A-1500, extract values of the rate of change of pressure dP of the hydraulic fluid of the continuously variable transmission A-1500, and compare the values of the rate of change of the pressure dP of the hydraulic fluid of the continuously variable transmission A-1500 to the minimum rate pressure threshold $dP_{min}$ corresponding to values of the rate of change of pressure for a steady load, e.g., no materials 100 are added to the container B-1100. The releasing state for the livestock feed mixer B-1000 is detected if the values of the rate of change of the pressure dP are below the minimum pressure rate threshold dPmin.

Similar to the minimum pressure threshold Pmin and the maximum pressure threshold Pmax, the minimum pressure rate threshold dPmin and the maximum pressure rate threshold dPmax can be predetermined based on manufacturer characteristics/requirements or be determined and dynamically adjusted based on the values of the mixing conditions measured in the step S2000 through interpolation and/or extrapolation.

In another example, the software instructions can be written and the electronic control unit A-1100 can be configured to detect values of the rate of change of the pressure dP corresponding to a negative rate of change of the pressure dP during a predetermined period of time Tn, e.g., between 1 second and 100 seconds, and preferably between 1 second and 20 seconds, and/or negative values of the rate of change of the pressure dP corresponding to a reduction of an average pressure Mp by a predetermined reduction ratio Ra, e.g., between 1% and 10% and preferably between 2% and 7%, wherein the average pressure Mp is measured over a predetermined average time period TMn, e.g., between 1 second and 100 seconds, and preferably between 1 second and 20 seconds.

In another example, the software instruction can be written and the electronic control unit A-1100 can be configured to receive the position signals, and determine the articulation state of the opening system B-1500. The releasing state for the livestock feed mixer B-1000 can be detected if the articulation state of the opening system B-1500 indicates an open state and/or an articulation towards an open state.

In addition, the position sensor A-1440 can be configured to provide flow signals commensurate with materials 100 flowing through the opening system B-1500, such as optical detection sensors and/or feed flow sensors.

In another example, the software instruction can be written and the electronic control unit A-1100 can be configured to receive the flow signals, and determine that a minimum quantity of the materials 100 is flowing through the opening system B-1500. The releasing state for the livestock feed mixer B-1000 can be detected if a minimum quantity of the materials 100 is flowing through the opening system B-1500.

If the releasing state is detected the process goes to a step S5500. Otherwise, the process goes to a step S6000.

In a step S5500, the process is configured to enhance the efficiency of the releasing of the livestock feed mixer B-1000.

For example, through software instructions executed by the electronic control unit A-1100, the hydraulic actuator A-1510 actuates the continuously variable transmission A-1500 to increase the hydraulic flow and vary the output speed $W_{out}$. The hydraulic actuator A-1510 can actuate the continuously variable transmission A-1500 to have a value of the speed ratio $R_{in/out}$ that is approximatively equal to the maximum speed ratio $R_{max}$ to facilitate the release of the materials 100 through the opening system B-1500 and to maximize the output power $T_{out}$ provided by the power source C-1000.

In a step S6000, it is determined if the livestock feed mixer B-1000 needs to be adjusted. The determination that the livestock feed mixer B-1000 needs to be maintained can be performed automatically through software instructions executed by the electronic control unit A-1100 and based on the values of the mixing parameters measured in the step S2000.

For example, the software instructions can be written and the electronic control unit A-1100 can be configured to receive the output speed signals, extract values of the output speed $W_{out}$, and compare the values of the output speed $W_{out}$ to the output target speed $W_{out\ target}$. The need to adjust the output of the livestock feed mixer B-1000 can be determined if the values of the output speed $W_{out}$ are not approximatively equal to the output target speed $W_{out\ target}$.

In another example, the software instructions can be written and the electronic control unit A-1100 can be configured to receive the output rate speed signals, extract values of the rate of change of the output speed $dW_{out}$, and compare the values of the rate of change of the output speed $dW_{out}$ to a minimum output speed rate threshold $dW_{out\ min}$. The need to adjust the output of the livestock feed mixer B-1000 can be determined if the values of the rate of change of the output speed $dW_{out}$ are not approximatively equal to the minimum output speed rate threshold $dW_{out\ min}$.

In another example, the software instructions can be written and the electronic control unit A-1100 can be configured to receive the output torque signals, extract values of the output torque $T_{out}$, and compare the values of the output torque $T_{out}$ to the output target torque $T_{out\ target}$. The need to adjust the output of the livestock feed mixer B-1000 can be determined if the values of the output torque $T_{out}$ are not substantially close to the output target torque $T_{out}$.

In another example, the software instructions can be written and the electronic control unit A-1100 can be configured to receive the output rate torque signals, extract values of the rate of change of the output torque $dT_{out}$, and compare the values of the rate of change of the output torque $dT_{out}$ to a minimum output torque rate threshold $dT_{out\ min}$. The need to adjust the output of the livestock feed mixer B-1000 can be determined if the values of the rate of change of the output torque $dT_{out}$ are not substantially close to the minimum output torque rate threshold $dT_{out\ min}$.

If the need to adjust the output of the livestock feed mixer B-1000 is determined the process goes to a step S6500. Otherwise, the process goes to a step S7000.

In a step S6500, the process is configured to actuate the continuously variable transmission A-1500 to adjust the output of the livestock feed mixer B-1000.

For example, through software instructions executed by the electronic control unit A-1100, the hydraulic actuator A-1510 actuates the continuously variable transmission A-1500 to increase and decrease the output speed $W_{out}$ and/or to decrease and increase the output torque $T_{out}$. The hydraulic actuator A-1510 can actuate the continuously variable transmission A-1500 to have a value of the speed ratio $R_{in/out}$ that is approximatively equal to the output target speed $W_{out\ target}$ and/or the output target torque $T_{out\ target}$.

In a step S7000, it is determined if the power source C-1000 needs to be protected. The determination that the power source C-1000 needs to be protected can be performed automatically through software instructions executed by the electronic control unit A-1100 and based on the values of the mixing conditions measured in the step S2000.

For example, the software instructions can be written and the electronic control unit A-1100 can be configured to receive the input speed signals, extract values of the input speed $W_{in}$, and compare the values of the input speed $W_{in}$ to a maximum input speed threshold $W_{in\ max}$ and a minimum input speed threshold $W_{in\ min}$. The need to adjust the power source C-1000 can be determined if the values of the input speed $W_{in}$ are above the maximum input speed threshold $W_{in\ max}$ or below the minimum input speed threshold $W_{in\ min}$.

In another example, the software instructions can be written and the electronic control unit A-1100 can be configured to receive the input rate speed signals, extract values of the rate of change of the input speed $dW_{in}$, and compare the values of the rate of change of the input speed $dW_{in}$ to a minimum input speed rate threshold $dW_{in\ min}$. The need to protect the power source C-1000 can be determined if the values of the rate of change of the input speed $dW_{in}$ are not substantially close to the minimum input speed rate threshold $dW_{in\ min}$ and/or substantially close to a maximum input speed rate of threshold dWin max.

In another example, the software instructions can be written and the electronic control unit A-1100 can be configured to receive the input speed signals and the input rate speed signals, extract values of the rate of change of the input speed $dW_{in}$ and values of the input speed $W_{in}$ and determine a need to protect the power source C-1000. The need to protect the power source C-1000 can be determined if the values of the rate of change of the input speed $dW_{in}$ and the values of the input speed $W_{in}$ indicate that the input speed $W_{in}$ is constantly decreasing, e.g., the values of the rate of change of the input speed $dW_{in}$ are negative and substantially constant over a predetermined period of time and/or the values of the input speed $W_{in}$ are below a minimum input speed threshold Win min. The predetermined period of time can be between 1 second and 100 seconds, and preferably between 1 second and 20 seconds.

In another example, the software instructions can be written and the electronic control unit A-1100 can be configured to receive the input torque signals, extract values of the input torque $T_{in}$, and compare the values of the input torque $T_{in}$ to a maximum input torque threshold $T_{in\ max}$ and a minimum input torque threshold $T_{in\ max}$. The need to adjust the power source C-1000 can be determined if the values of the input torque $T_{in}$ are above the maximum input torque threshold $T_{in\ max}$ or below the minimum input torque threshold $T_{in\ min}$.

In another example, the software instructions can be written and the electronic control unit A-1100 can be configured to receive the input rate torque signals, extract values of the rate of change of the input torque $dT_{in}$, and compare the values of the rate of change of the output torque $dT_{in}$ to a minimum input torque rate threshold $dT_{in\ min}$. The need to maintain the input of the power source C-1000 can be determined if the values of the rate of change of the input torque $dT_{in}$ are not substantially close to the minimum input torque rate threshold $dT_{in\ min}$.

In another example, the software instructions can be written and the electronic control unit A-1100 can be configured to receive the input torque signals and the input rate torque signals, extract values of the rate of change of the input torque $dT_{in}$ and values of the input torque $T_{in}$ and determine a need to adjust the power source C-1000. The need to adjust the power source C-1000 can be determined if the values of the rate of change of the input torque $dT_{in}$ and the values of the input torque $T_{in}$ indicate that the input torque $T_{in}$ is constantly increasing, e.g., the values of the rate of change of the input torque $dT_{in}$ are positive and substantially constant over a predetermined period of time and/or the values of the input torque $T_{in}$ stay below the minimum input torque threshold $T_{in\ min}$. The predetermined period of time can be between 1 second and 100 seconds, and preferably between 1 second and 20 seconds.

If the need to protect the power source C-1000 is determined the process goes to a step S7500. Otherwise, the process stops.

In the step S7500, the process is configured to adjust the continuously variable transmission A-1500 and/or the power source C-1000 to protect the power source C-1000.

For example, through software instructions executed by the electronic control unit A-1100, the hydraulic actuator A-1510 actuates the continuously variable transmission A-1500 to increase and/or decrease the speed ratio $R_{in/out}$ to decrease and/or increase the output speed $W_{out}$ and/or the input torque $T_{in}$. The hydraulic actuator A-1510 can actuate the continuously variable transmission A-1500 to have a value of the speed ratio $R_{in/min}$ that the output speed $W_{out}$ is between the minimum output speed threshold $W_{out\ min}$ and the maximum input speed threshold $W_{out\ max}$, and/or the input torque $T_{in}$ is between the minimum input torque threshold $T_{in\ min}$ and the maximum input torque threshold $T_{in\ max}$.

In another example, through software instructions executed by the electronic control unit A-1100, the power source actuator C-1500 can actuate the power source C-1000 to increase the input speed $W_{in}$ and/or the input torque $T_{in}$ provided by the power source C-1000.

In a step S8000, it is determined if the driveline B-1200 needs to be protected. The determination that the driveline B-1200 needs to be protected can be performed automatically through software instructions executed by the electronic control unit A-1100 and based on the values of the mixing conditions measured in the step S2000.

For example, the software instructions can be written and the electronic control unit A-1100 can be configured to receive the driveline temperature signals, extract values of the driveline temperature TempDr, and compare the values of the driveline temperature TempDr to a maximum driveline temperature threshold $TempDr_{max}$. The need to protect the driveline B-1200 can be determined if the values driveline temperature TempDr are above the maximum driveline temperature threshold $TempDr_{max}$.

In another example, the software instructions can be written and the electronic control unit A-1100 can be configured to receive the driveline temperature signals, extract values of rate of change of the driveline temperature dTempDr, and compare the values of rate of change of the driveline temperature dTempDr to a maximum driveline temperature rate threshold $TempDr_{max}$. The need to protect the driveline B-1200 can be determined if the values of the rate of change of the driveline temperature TempDr are above the maximum driveline temperature rate threshold $\text{TempDr}_{max}$.

In another example, the software instructions can be written and the electronic control unit A-1100 can be configured to receive the driveline temperature signals, extract values of the rate of change of the driveline temperature dTempDr and values of the driveline temperature TempDr and determine a need to protect the driveline B-1200. The need to protect the driveline B-1200 can be determined if the values of the rate of change of the driveline temperature dTempDr and the values of the driveline temperature TempDr indicate that the temperatures of the elements of the driveline B-1200 are constantly increasing, e.g., the values of the rate of change of the driveline temperature dTempDr are positive and substantially constant over a predetermined period of time and/or the values of the driveline temperature TempDr are above the maximum driveline temperature threshold $\text{TempDr}_{max}$. The predetermined period of time can be between 1 second and 100 minutes, and preferably between 1 minute and 20 minutes.

In the step S8500, the process is configured to adjust the continuously variable transmission A-1500 and/or the power source C-1000 to protect the driveline B-1200.

For example, through software instructions executed by the electronic control unit A-1100, the hydraulic actuator A-1510 can actuate the continuously variable transmission A-1500 to increase the speed ratio $R_{in/out}$ to decrease the output speed $W_{out}$. The hydraulic actuator A-1510 can actuate the continuously variable transmission A-1500 to have a value of the speed ratio $R_{in/out}$ such that the output speed $W_{out}$ is below a maximum input speed threshold $W_{out\_max}$ corresponding to an input speed for which the driveline B-1200 is not overheating and/or exposed to failure, e.g., cracks, excessive friction, or the like.

FIG. 4 is a schematic view of a hardware diagram of an electronic control unit A-1100 for operating the control system A-1000, according to certain aspects of the disclosure.

As shown in FIG. 4, systems, operations, and processes in accordance with this disclosure may be implemented using the processor A-1102 or at least one application specific processor (ASP). The processor A-1102 may utilize a computer readable storage medium, such as the memory 1104 (e.g., ROM, EPROM, EEPROM, flash memory, static memory, DRAM, SDRAM, and their equivalents), configured to control the processor A-1102 to perform and/or control the systems, operations, and processes of this disclosure. Other storage mediums may be controlled via a disk controller A-1106, which may control a hard disk drive A-1108 or optical disk drive A-1110.

The processor A-1102 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor A-1102 may be a separate device or a single processing mechanism. Further, this disclosure may benefit from parallel processing capabilities of a multi-cored processor.

In another aspect, results of processing in accordance with this disclosure, e.g., the status bar A-1210, may be displayed via the output unit A-1200. The output unit A-1200 can include a display controller A-1112 that controls a monitor A-1114. The monitor A-1114 may be peripheral to or part of the electronic control unit A-1100. The display controller A-1112 may also include at least one graphic processing unit for improved computational efficiency.

Moreover, the output unit A-1200 and the input unit A-1300 may be merged together by having the monitor A-1114 provided with a touch-sensitive interface to a command/instruction interface.

Additionally, the electronic control unit A-1100 may include an I/O (input/output) interface A-1116, provided for inputting sensor data from the plurality of sensors A-1400, e.g., the output torque sensor A-1410, the hydraulic fluid temperature sensor A-1420, the output speed sensor A-1430, the position sensor A-1440, and the hydraulic pressure sensor A-1450.

Further, other input devices may be connected to an I/O interface A-1116 as peripherals or as part of the controller A-1100. For example, a keyboard or a pointing device such as a mouse A-1120 may control parameters of the various processes and algorithms of this disclosure, and may be connected to the I/O interface A-1116 to provide additional functionality and configuration options, or to control display characteristics. Actuators A-1122 which may be embodied in any of the elements of the apparatuses described in this disclosure such as the hydraulic actuator A-1510 and/or the power actuator C-1500, may also be connected to the I/O interface A-1116.

The above-noted hardware components may be coupled to the network A-1124, such as the Internet or a local intranet, via a network interface A-1126 for the transmission or reception of data, including controllable parameters to a mobile device. A central BUS A-1128 may be provided to connect the above-noted hardware components together, and to provide at least one path for digital communication there between.

FIGS. 5A-5B are sectional views of the variable displacement pump 4000 in a centered position and in a startup position of the livestock feed mixer 1000, according to certain aspects of the disclosure.

The variable displacement pump 4000 can include a housing 146, a barrel 148 disposed in the housing 146 to rotate about a barrel axis BA, the swashplate 138, a servo piston assembly 200 that articulates the swashplate 138, and the bias system 400 that maintains the swashplate 138 in the startup position when pressure in the variable displacement pump 4000 is substantially low.

The barrel 148 may define a series of barrel chambers 151 spaced in a circular array at regular intervals about the barrel axis BA. Each barrel chamber of the series of barrel chambers 151 may be configured to receive one barrel piston 152, which may perform oscillatory motion within the respective barrel chamber 151. A terminal portion of each barrel piston 152 may be biased against the swashplate 138 such that each barrel piston 152 performs oscillatory motion due to the rotation of the barrel 148 and an inclination of the swashplate 138 with respect to the housing 146. Specifically, when the barrel 148 is rotated, inclination of the swashplate 138 may cause the barrel pistons 152 to undergo an oscillatory displacement in and out of the barrel 148 along the barrel axis BA. Due to such movement of the barrel pistons 152, the hydraulic fluid may be drawn into the barrel chambers 151 and pushed out of the chambers 151.

To cause rotational motion of the barrel 148 within the housing 146, the variable displacement pump 4000 may include a shaft 154 that connects the power source C-1000 to the barrel 148.

The amount of hydraulic fluid drawn into and out of the barrel chambers 151 may also be controlled by varying stroke length of each barrel piston 152, which may increase the amount of hydraulic fluid that is displaced to the predetermined level during each rotation of the barrel 148. The stroke length of each barrel piston 151 may be varied by changing the inclination and/or articulating of the swashplate 138 with respect to the housing 146.

The swashplate 138 can be articulated by the servo piston assembly 200 between a positive position, e.g., maximum positive fluid displacement, the centered position, e.g., no displacement of fluid, and a negative position, e.g., the negative fluid displacement is maximized, speed ratio $R_{in/out}$ is maximized and the output speed $W_{out}$ is minimized.

The bias system 400 can maintain the swashplate 138 in the startup position when the power source C-1000 has just turn on and/or off, as illustrated in FIG. 5B.

The bias system 400 can assure that the swashplate 138 is in the startup position, e.g., substantially close to the negative position and far away from the centered position, to prevent the power source C-1000 and/or the livestock food mixer B-1000 to undergo excessive loads which may damage the power source C-1000 and/or the livestock food mixer B-1000.

The servo piston assembly 200 can include a chamber 210, a first inlet 212 that opens the chamber 210, a second inlet 214 opposite to the first inlet 212 that opens the chamber 210, a piston 220 located in the chamber 210 between the first inlet 212 and the second inlet 214 and linked with the swashplate 138.

To articulate the swashplate 138 from the centered position to the negative position, hydraulic fluid is received in the chamber 210 by the first inlet 212 and the piston 220 slides from the first inlet 212 towards the second inlet 214. Similarly, to articulate the swashplate 138 from the negative position to the centered position, hydraulic fluid is received in the chamber 210 by the second inlet 214 and the piston 220 slides from the second inlet 214 towards the first inlet 212.

To articulate the swashplate 138 from the centered position to the positive position, hydraulic fluid is received in the chamber 210 by the second inlet 214 and the piston 220 slides from the second inlet 214 towards the first inlet 212. Similarly, to articulate the swashplate 138 from the positive position to the centered position, hydraulic fluid is received in the chamber 210 by the first inlet 212 and the piston 220 slides from the first inlet 212 towards the first inlet 214.

The bias system 400 can be partially located in the chamber 210 and can include an adjusting rod 410 that extends from the piston 220 to an external portion of the housing 146, a shoulder 420 positioned on the external portion of the housing 146 and around the adjusting rod 410, and a bias mechanism 430 positioned around the adjusting rod 410 and that extends between the second inlet 214 and the piston 220.

The bias mechanism 430 can be any kind of mechanical and/or hydro-mechanical device, e.g., helicoidal spring, torsion spring, gas spring, or the like, that generate a predetermined force to center the swashplate 138 in the startup position when substantially low pressure is present in the variable displacement pump 2000, e.g., the power source C-1000 is turn off and/or on, wherein the startup position may be offset from the centered position The adjusting rod 410 can be configured to thread in the shoulder 420 to pull the piston 220 and the bias mechanism 430 towards the second inlet 214 and to push the piston 220 and the bias mechanism 430 away from the second inlet 214 in order to adjust the position of the startup position between the centered position and the negative position.

The location of the startup position can be adjusted via the adjusting rod 410 such that the swashplate 138 is substantially close to the negative position and far away from the centered position, to prevent the power source C-1000 and/or the livestock food mixer B-1000 to undergo excessive loads which may damage the power source C-1000 and/or the livestock food mixer B-1000 when the power source C-1000 and/or the livestock food mixer B-1000 is turn off and/or on, e.g., when pressure of the hydraulic fluid in the variable displacement pump 2000 is low.

The bias system 400 can also include a first limit adjustment stop 216 that extends from an external portion of the housing 146 to a first terminal portion of the chamber 210, a first shoulder 216a positioned on the external portion of the housing 146 and around the limit adjustment stop 216 to hold the first limit adjustment stop 216 in place. The first limit adjustment stop 216 prevents the swashplate 138 from moving beyond a predetermined limit in the positive direction.

The bias system 400 can also include a second limit adjustment stop 218 that extends from an external portion of the housing 146 to a second terminal portion of the chamber 210, a second shoulder 218a positioned on the external portion of the housing 146 and around the second limit adjustment stop 218 to hold the second limit adjustment stop 218 in place. The second limit adjustment stop 218 prevents the swashplate 138 from moving beyond a predetermined limit in the negative direction.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A system, comprising:
    a power source that provides an input speed at an input torque;
    an implement including an adjustable gearbox driven by the power source; and
    an electronic control unit configured to
        determine the input speed provided by the power source,
        compare the input speed with a minimum input speed threshold, and compare the input speed with a maximum input speed threshold, and
        adjust the power source to protect the power source when the input speed is less than the minimum input speed threshold or when the input speed is greater than the maximum input speed threshold,
    wherein the electronic control unit is further configured to
        determine rates of change of the input speed over a predetermined time period, and
        adjust the power source to protect the power source when the rates of change of the input speed are negative and substantially constant over the predetermined time period.

2. The system according to claim 1, wherein the implement is a mixer.

3. The system according to claim 1, wherein the power source is a tractor with a power take-off.

4. The system according to claim 1, wherein the adjustable gearbox is a continuously variable transmission.

5. The system according to claim 1, wherein the electronic control unit is configured to determine the input speed by receiving an input speed and extracting a value of the input speed.

6. A system, comprising:
a power source that provides an input speed at an input torque;
an implement including an adjustable gearbox driven by the power source; and
an electronic control unit configured to
determine the input torque provided by the power source,
compare the input torque with a minimum input torque threshold, and compare the input torque with a maximum input torque threshold, and
adjust the power source to protect the power source when the input torque is less than the minimum input torque threshold or when the input torque is greater than the maximum input torque threshold,
wherein the electronic control unit is further configured to
determine rates of change of the input torque over a predetermined time period, and
adjust the power source to protect the power source when the rates of change of the input torque are positive and substantially constant over the predetermined time period.

7. The system according to claim 6, wherein the implement is a mixer.

8. The system according to claim 6, wherein the power source is a tractor with a power take-off.

9. The system according to claim 6, wherein the adjustable gearbox is a continuously variable transmission.

10. The system according to claim 6, wherein the electronic control unit is configured to determine the input torque by receiving an input torque and extracting a value of the input torque.

* * * * *